United States Patent [19]

Amatsu et al.

[11] 4,067,629
[45] Jan. 10, 1978

[54] STORAGE RECEPTACLE FOR MAGNETIC TAPE CASSETTE

[75] Inventors: Hideo Amatsu, Yokohama; Kazumi Fujimoto, Hoya; Kishio Ikeda, Tokyo, all of Japan

[73] Assignee: Sony Corporation, Tokyo, Japan

[21] Appl. No.: 673,415

[22] Filed: Apr. 5, 1976

[30] Foreign Application Priority Data

Apr. 4, 1975 Japan ............................. 50-44684[U]
Apr. 3, 1975 Japan ............................. 50-44148[U]

[51] Int. Cl.² .......................................... A47B 81/06
[52] U.S. Cl. .................................. 312/319; 312/15; 312/20; 220/306; 206/387
[58] Field of Search ................... 312/319, 12, 15, 20, 312/111; 292/87; 220/339, 306; 206/387, 265

[56] References Cited

U.S. PATENT DOCUMENTS

| 3,348,668 | 10/1967 | Amatsu et al. | 312/20 |
| 3,380,581 | 4/1968 | Landgraf | 206/387 |
| 3,389,942 | 6/1968 | Jacob | 312/20 |
| 3,638,788 | 2/1972 | Solomon | 206/387 |
| 3,866,990 | 2/1975 | McRae | 312/15 |
| 3,899,229 | 8/1975 | Ackeret | 312/111 |
| 3,904,259 | 9/1975 | Hoffmann et al. | 312/111 |
| 3,909,088 | 9/1975 | Dennehey et al. | 312/20 |
| 3,968,880 | 7/1976 | Ostrowsky | 220/306 |
| 3,969,007 | 7/1976 | Lowry | 312/15 |

FOREIGN PATENT DOCUMENTS 224,840    1968    U.S.S.R. ............................. 206/387

Primary Examiner—Paul R. Gilliam
Assistant Examiner—Victor N. Sakran
Attorney, Agent, or Firm—Lewis H. Eslinger; Alvin Sinderbrand

[57] ABSTRACT

A storage receptacle for a magnetic tape cassette which comprises a housing having spaced apart, parallel side walls which, between their forward edges, define an opening of the housing, and a holder pivotally connected with the housing for swinging movement through such opening between an opened position in which the holder projects forwardly from the housing for slidably receiving and relinquishing a cassette, and a closed position in which the holder cooperates with the housing for enclosing a cassette cradled in the holder between spaced apart side walls of the holder; flexibly resilient stop elements project inwardly from one of the side walls of the holder so as to be deflected out of the path of a cassette during its slidable insertion and removal in respect to the holder, while such stop elements return to their normal positions for engaging reel hubs of a cassette, and thereby resisting turning of the supply and takeup reels when the cassette is fully inserted or cradled in the cassette.

7 Claims, 15 Drawing Figures

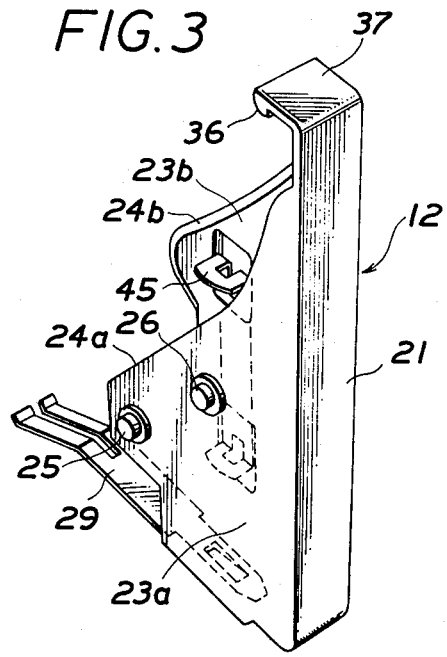
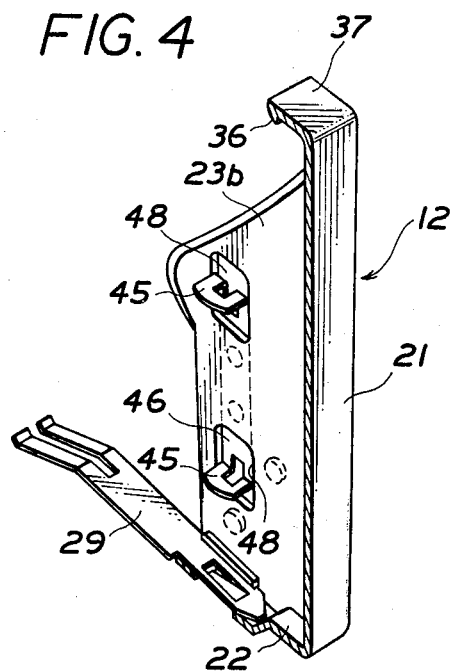
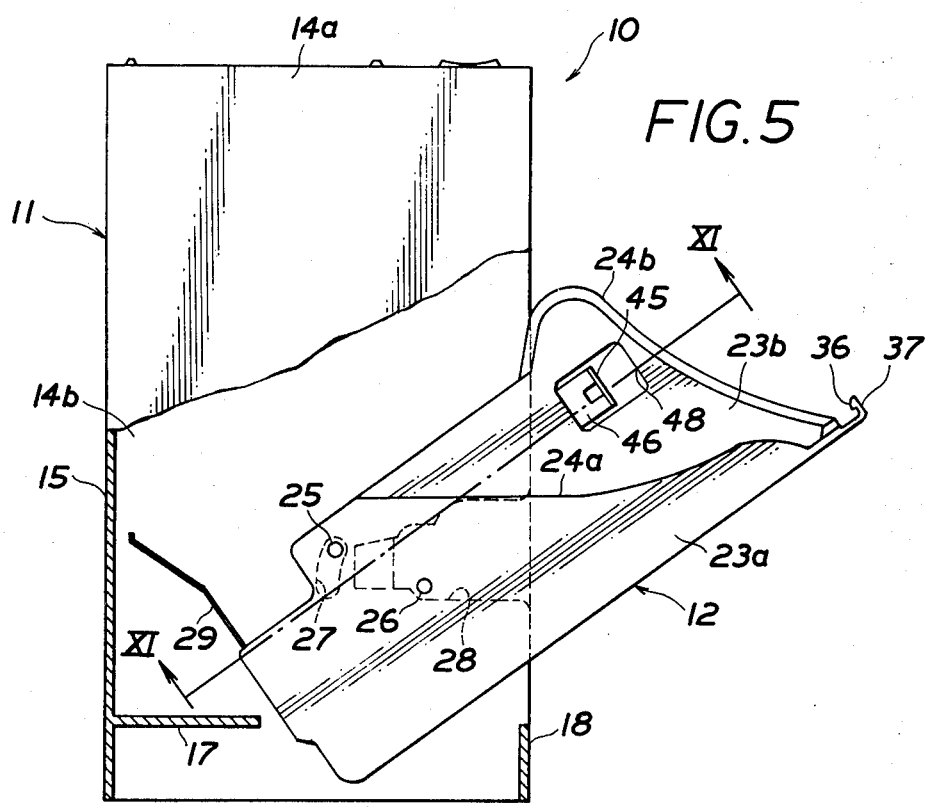

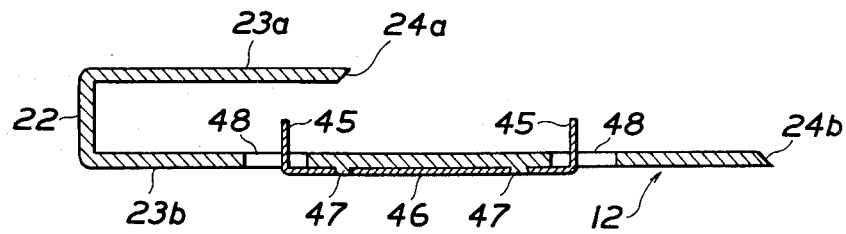
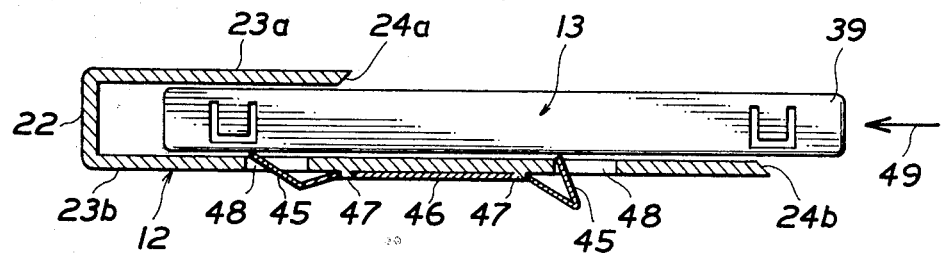
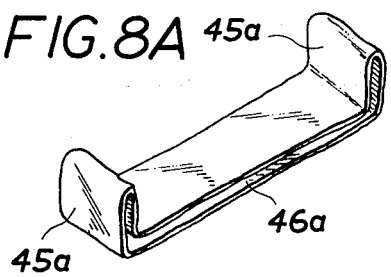
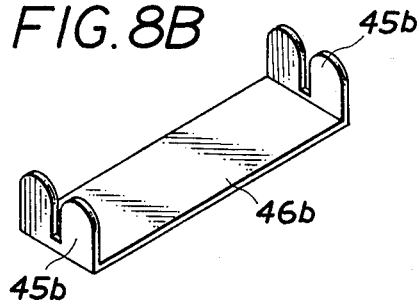
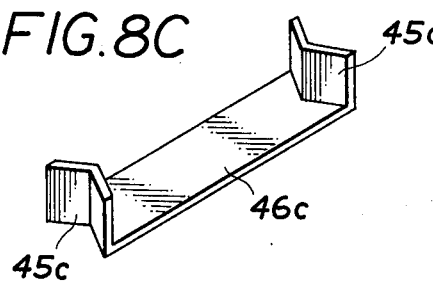
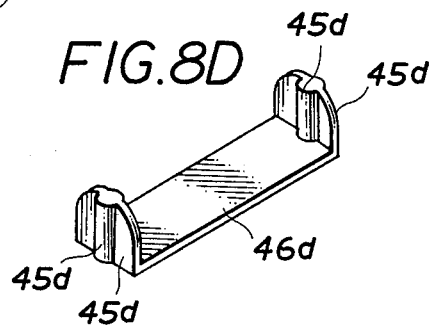

STORAGE RECEPTACLE FOR MAGNETIC TAPE CASSETTE

BACKGROUND OF THE INVENTION

1. Field of the Invention

This invention relates generally to storage receptacles for magnetic tape cassettes, and more particularly is directed to improvements in receptacles suitable for storing magnetic tape cassettes in a manner such that each cassette is enclosed in an individual compartment or space and protected from dirt, dust and the like.

2. Description of the Prior Art

Many types of storage receptacles for magnetic tape cassettes have been proposed. For example, in U.S. Pat. No. 3,904,259, a magnetic tape cassette storage container is disclosed to include a generally rectangular casing having an opening along one of its sides through which the cassette itself is slidably inserted in, and removed from the casing. A pivoted door is provided for closing the open side of the casing, and a generally U-shaped spring is mounted, at its center, against the inner surface of the side wall of the casing opposed to the open side thereof. During the insertion of a cassette into the casing, the cassette acts against the normally U-shaped spring so as to flex or relatively flatten the latter, with the result that the spring exerts a force on the cassette tending to eject the latter from the casing. Therefore, when inserting the cassette in the casing, the cassette has to be manually held within the casing until the door is closed and latched in its closed position. The foregoing operations inconveniently require the use of two hands for insertion of a cassette. Furthermore, when the latch is released to permit opening of the door, the spring force acting on the cassette may forcibly eject the cassette completely out of the casing past the open door. Thus, the foregoing magnetic tape cassette storage container has disadvantageous characteristics both when inserting and removing a cassette. Furthermore, since the cassette is slidably inserted in, and removed from the casing of the container while acted upon by the spring, the cassette housing will become scratched or marred in the course of repeated movements into and out of the casing.

In another storage container for a magnetic tape cassette, for example, as disclosed in U.S. Pat. No. 3,899,229, a rectangular casing which is open at the front side thereof is provided with a drawer which is guided for rectilinear movements between a closed position, in which the drawer is contained within the casing with the open side of the latter being closed by the drawer front, and an opened or extended position in which a cassette can be inserted downwardly in, or removed upwardly from the extended drawer. A spring is interposed between the drawer and the casing so as to continuously urge the drawer to its opened or extended position, and a latch is provided for releasably holding the drawer in its closed position against the force of such spring. Further, the bottom of the drawer has two spaced apart, rigid tabs projecting upwardly therefrom to enter the reel hubs of a cassette placed from above in the drawer for holding the supply and takeup reels against rotation while the cassette is stored. Although such storage container provided with a rectilinearly slidable drawer avoids some of the problems associated with the existing storage container first described above, in that the cassette is cradled in the drawer while being inserted in, and removed from the casing and thus protected from scratching or marring, the structures provided for guiding the drawer in its rectilinear sliding movements relative to the casing tend to jam. Further, when the drawer is in its opened position, the insertion or removal of a cassette inconveniently requires rather complicated and precise manipulations of the cassette in view of the rigid tabs provided for holding the reels against rotation.

In still another existing storage receptacle for a magnetic tape cassette, for example, as disclosed in U.S. Pat. No. 3,909,088, the receptacle includes a housing constituted by spaced apart, L-shaped side walls having their vertical and horizontal portions connected by a back wall and a bottom wall, respectively, and a substantially rectangular container which is pivotally connected to the housing for swinging relative to the latter about an axis extending through a corner of the rectangular casing and through ends of the horizontal portions of the L-shaped side walls of the housing. In an opened position of the container in which the latter extends forwardly from the pivoting axis, the upwardly facing side of the rectangular casing is open for the insertion and removal of a cassette therethrough. When the container is pivotally moved to its closed position, the sides thereof interfit with the adjacent L-shaped side walls of the housing and the container and housing cooperate to enclose the cassette therein. Although the pivotal connection of the container with the housing is advantageous in that it is simple and not subject to binding or jamming, no provision is made for preventing rotation of the reels, and consequent loosening of the tape, when a cassette is stored in the receptacle.

Accordingly, it is an object of this invention to provide an improved storage receptacle for a magnetic tape cassette which avoids the above mentioned disadvantages of the storage receptacles or containers previously proposed for that purpose.

More specifically, it is an object of this invention to provide a storage receptacle for a magnetic tape cassette which facilitates the insertion and removal of the cassette without the likelihood of scratching or marring the cassette housing during such insertion and removal, and in which upon the insertion of a cassette in the receptacle, the supply and takeup reels of the cassette are held against rotation in the cassette casing.

In accordance with an aspect of this invention, in a storage receptacle for a magnetic tape cassette comprising a housing having spaced apart, parallel side walls which, between their forward edges, define an opening of the housing, and a holder pivotally connected with the housing for swinging movement through such opening between an opened position in which the holder projects forwardly from the housing for receiving and relinquishing a cassette, and a closed position in which the holder cooperates with the housing for enclosing a cassette cradled in the holder; the pivoted holder has spaced apart side walls movable between the side walls of the housing, and flexibly resilient stop elements project inwardly from one of the side walls of the holder for engaging the reel hubs of a cassette disposed in the holder and thereby resisting turning of the supply and takeup reels of the cassette.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIG. 3 is a perspective view of the holder which forms a part of the storage receptacle shown on FIGS. 1 and 2;

FIG. 4 is a perspective view similar to that of FIG. 3, but showing the holder partly broken away and in section;

FIG. 5 is a side elevational view of the storage receptacle according to this invention with the housing thereof being shown partly broken away and in section, and with the holder being shown at its opened position;

FIG. 6 is a sectional view of the holder forming part of a storage receptacle, and which is taken along the line VI—VI on FIG. 5 for showing details of stop elements provided on the holder in accordance with this invention;

FIG. 7 is a sectional view similar to that of FIG. 6, but illustrating the manner in which the stop elements are deflected during the insertion of a cassette in the holder;

FIGS. 8A-8D are perspective views respectively showing other forms of stop elements that may be provided on the holder of a storage receptacle according to this invention;

DESCRIPTION OF THE PREFERRED EMBODIMENTS

Figure 1:
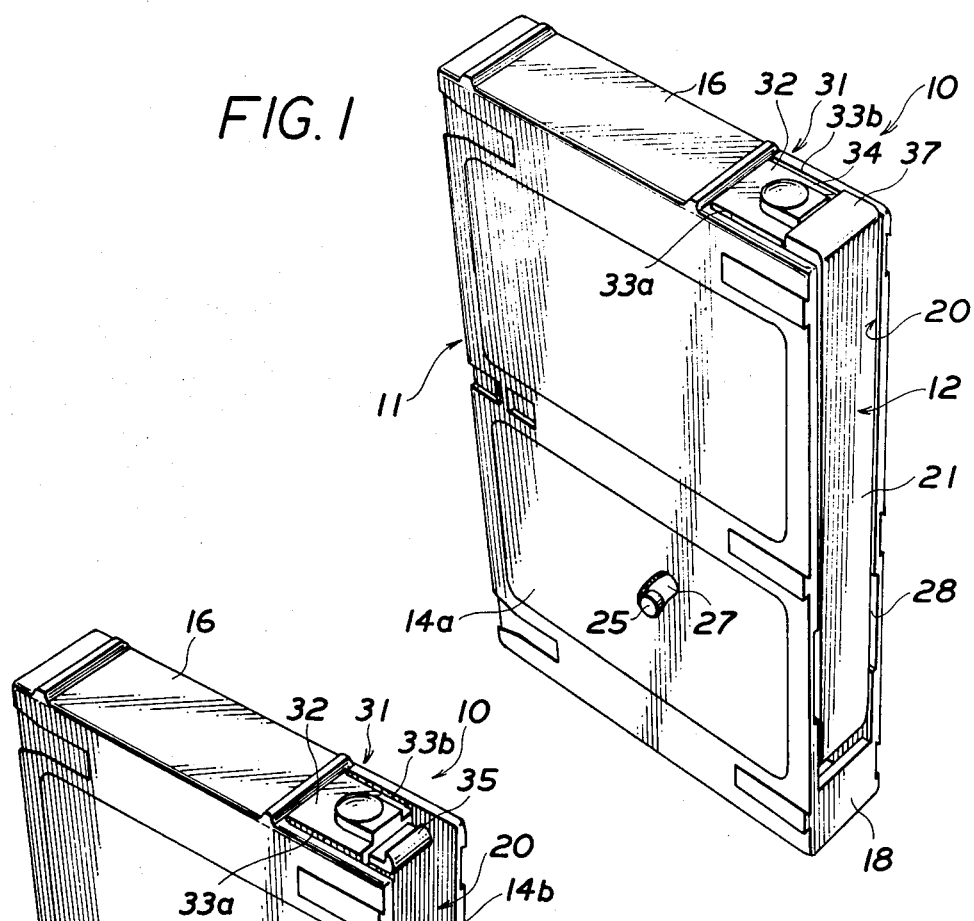
FIG. 1 is a perspective view of a magnetic tape cassette storage receptacle according to an embodiment of this invention, and which is shown in its closed condition.
Figure 2:
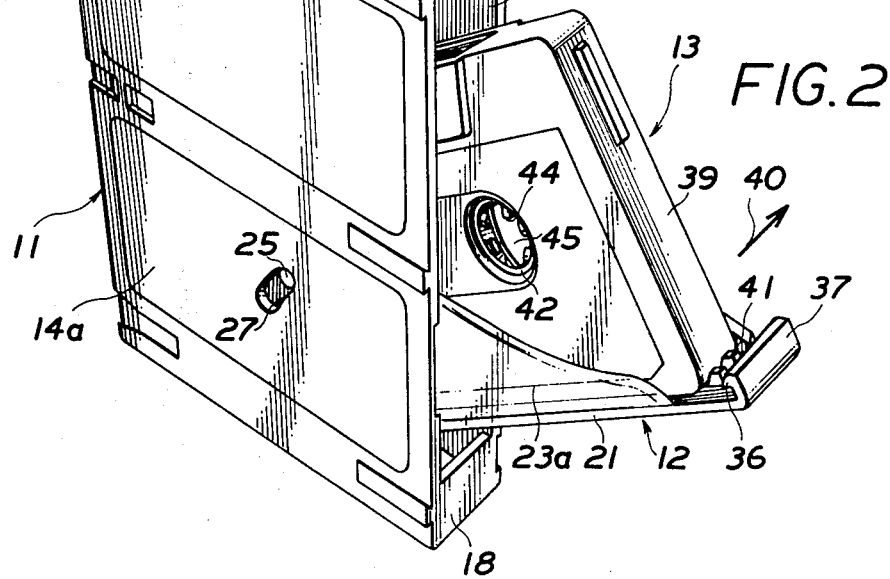
FIG. 2 is a perspective view similar to that of FIG. 1, but showing the storage receptacle in its open condition with a magnetic tape cassette cradled in the holder of the storage receptacle.

Referring to the drawings in detail, and initially to FIGS. 1 and 2 thereof, it will be seen that a magnetic tape cassette storage receptacle 10 of a type to which this invention may be advantageously applied generally comprises a housing 11 and a holder 12 which is pivotally connected with housing 11 for swinging movement relative to the latter between an opened position (FIG. 2) in which holder 12 projects forwardly from housing 11 for receiving and relinquishing a cassette 13, and a closed position (FIG. 1) in which holder 12 cooperates with housing 11 for enclosing a cassette cradled in the holder.

The housing 11 which is preferably molded of a suitable plastic resin is shown to include spaced apart, parallel side walls 14a and 14b which are substantially rectangular (FIGS. 1, 2 and 5), and which are joined together by a back wall 15, a top wall 16, a shelf or abutment 17 directed forwardly from the lower end portion of back wall 15, and a cross piece 18 extending between the lower end portions of side walls 14a and 14b at the front of housing 11. In the foregoing housing 11, a vertically elongated opening 20 is defined at the front of the housing between the forward edges of side walls 14a and 14b above cross piece 18.

As shown particularly on FIGS. 3 and 4, the holder 12, which is also preferably molded of a plastic resin, includes a front wall 21 dimensioned to close opening 20 in the closed position of holder 12, a bottom wall 22 directed substantially at right angles to front wall 21 for defining a corner C at the bottom of the latter, and spaced apart side walls 23a and 23b directed upwardly from bottom wall 22 along the opposite sides of front wall 21. The side walls 23a and 23b of holder 12 are suitably spaced apart to accommodate a magnetic tape cassette 13 therebetween, and preferably have upper edges 24a and 24b, respectively, that are inclined downwardly from front wall 21 and bevelled inwardly.

In order to pivotally connect holder 12 with housing 11 in the illustrated receptacle 10, first laterally aligned pivot members 25 project outwardly from side walls 23a and 23b of holder 12 at substantial distances from front wall 21, and second laterally aligned pivot members 26 also project outwardly from side walls 23a and 23b and are located closer to front wall 21 than pivot members 25 at a greater distance upwardly from bottom wall 22.

The side walls 23a and 23b of holder 21 are movable between side walls 14a and 14b of housing 11, and such side walls 14a and 14b are formed with arcuate slots 27 therein which extend generally vertically, and which are adapted to slidably receive the first pivot members 25 extending from the adjacent side walls 23a and 23b of holder 12. Further, as shown in broken lines on FIG. 5, the inner surfaces of side walls 14a and 14b of the housing may have recesses 28 extending forwardly in respect to the slots 27 and opening at the forward edges of side walls 14a and 14b for loosely accommodating the second pivot members 26 which project from the adjacent side walls 23a and 23b of holder 12.

As shown particularly on FIG. 5, a leaf spring 29 may extend rearwardly from, and be secured to bottom wall 22 of holder 12 so as to be movable with the latter. Spring 29 is formed so that, in the closed position of holder 12, the free end of spring 29 bears downwardly on the shelf or abutment 17 provided within the lower portion of housing 11.

In order to releasably reatin holder 12 in its closed position (FIG. 1), storage receptacle 10 is further shown to include a latch mechanism 31. Such latch mechanism 31 may include a resilient tongue 32 formed as a forwardly directed extension of top wall 16 of housing 11. Tongue 32 is separated from the adjacent top edge portions of side walls 14a and 14b by slots 33a and 33b so as to permit tongue 32 to be depressed downwardly between the top edge portions of walls 14a and 14b, for example, by the manual application of pressure on tongue 32 at a pad 34 provided thereon. A latch element 35 (FIG. 2) is provided at the free end of resilient tongue 32 in the form of an upwardly directed raked tooth 35 having an upwardly and rearwardly sloping front surface. The latch 31 is completed by a latch element 36 (FIGS. 2, 3 and 4) in the form of a raked tooth depending from the back edge of a flange 37 directed rearwardly from the upper end of front wall 21 of holder 12. When holder 12 is moved to its closed position (FIG. 1) latch tooth 36 at the top of the holder snaps over and engages latch tooth 35 on tongue 32 so as to retain holder 12 in its closed position. On the other hand, when tongue 32 is depressed by the application of downwardly directed pressure to pad 34, latch tooth 35 is moved downwardly and thus disengaged from latch tooth 36 so as to free holder 12 for movement from its closed position to its opened position.

As is shown on FIG. 2, the conventional magnetic tape cassette 13 having a generally rectangular cassette housing 39 is disposed or cradled between side walls 23a and 23b of holder 12 with one of the relatively long sides of cassette housing 39 extending along front wall 21, and with a relatively short side of the cassette housing resting against bottom wall 22 of the cassette housing. When holder 12 is in its opened position (FIGS. 2 and 5) cassette 13 may be conveniently withdrawn therefrom in the forward and upward direction, as indicated by the arrow 40. In order to ensure that flange 37 and latch tooth 36 thereon will not interfere with such withdrawal of the cassette 13 from holder 12, inclined projections 41 (FIGS. 2 and 5) are formed on front wall 21 a short distance below flange 37 and act to upwardly deflect the adjacent corner of cassette housing 39 as the cassette is being withdrawn from holder 12.

In the closed position of holder 12 (FIG. 1), pivot members 25 engage the lower ends of slots 27 for initially defining the fulcrum of pivotal movement of holder 12, while pivot members 26 engage the upper margins of recesses 28 to prevent lifting of holder 12, and hence disengagement of latch tooth 36 from latch tooth 35, under the influence of the upwardly directed force of spring 29 bearing on abutment 17.

Pivot members 25 are desirably disposed so that the fulcrum for holder 12 defined by the engagement of such pivot members 25 with the lower ends of slots 27 in the closed position of holder 12 will be spaced rearwardly in respect to the center of gravity of holder 12 with a cassette in the latter. Thus, when latch 31 is released by depressing tongue 32, the force of spring 29 in combination with the force of gravity will cause forward pivotal movement of holder 12 away from its closed position about the above mentioned fulcrum. Following the initial pivotal movement of holder 12 from its closed position, leaf spring 29 will lift off seat or abutment 17 and thus no longer influence the movement of holder 12.

In the course of the forward pivotal movement of holder 12 away from its closed position, pivot members 26 move downwardly in an arcuate path within recesses 28 and, when holder 12 attains an intermediate position, pivot members 26 will engage the lower margins of recesses 28. Pivot members 26 are desirably located so that, when holder 12 attains the mentioned intermediate position, the engagement of pivot members 26 with the lower margins of recesses 28 defines a fulcrum for further pivotal movement of holder 12 which is also disposed rearwardly in respect to the center of gravity of holder 12 with a cassette therein. Therefore, forward pivotal movement of holder 12 continues about the fulcrum defined by the engagement of pivot members 26 with the lower margins of recesses. During such further forward pivotal movement of holder 12, pivot members 25 move upwardly in arcuate slots 27 until pivot members 25 engage the upper ends of the respective slots and thereby limit the forward pivotal movement of holder 12 at the opened position thereof (FIGS. 2 and 5).

It will be apparent from the above that, in all positions of holder 12 ranging from its closed position to its opened position, the fulcrum for pivotal movement of holder 12 is desirably spaced rearwardly from the center of gravity of the holder with a cassette therein. Thus, upon the release of latch 31, holder 12 is automatically moved by the force of gravity from its closed position to its opened position. It will further be seen that, in the storage receptacle 10, the fulcrum for pivotal movement of holder 12 is desirably shifted forwardly in respect to housing 11, in the course of the forward pivotal movement of holder 12 from its closed position to its opened position.

Figure 9:
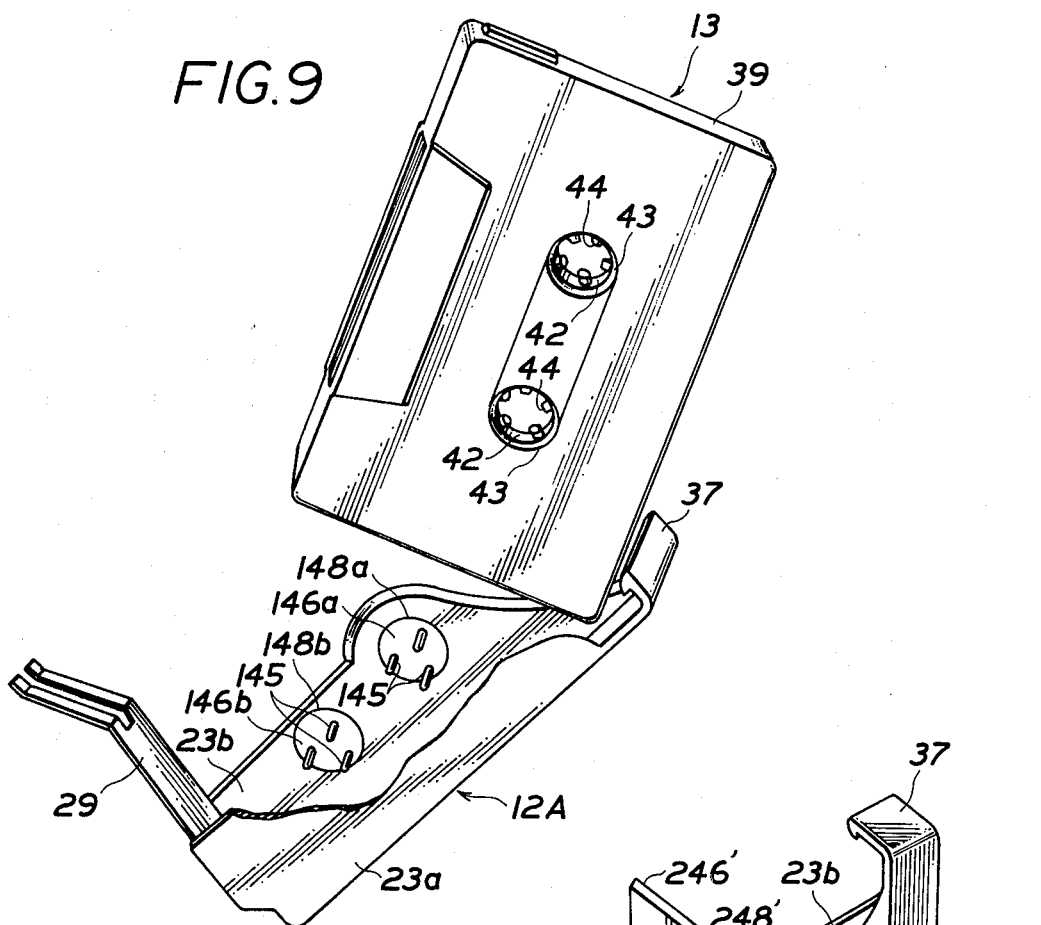
FIGS. 9, 10 and 11 are perspective views, partly broken away and in section, and respectively showing the holders of storage receptacles according to still other embodiments of the invention.

As is shown particularly on FIG. 9, the conventional magnetic tape cassette 13 to be contained in a storage receptacle according to this invention is of the type in which the cassette housing 39 contains tape supply and takeup reels disposed in side-by-side relation and having reel hubs 42 exposed at openings 43 in the cassette housing. The reel hubs are shown to have inwardly directed projections or splines 44 by which the respective reels are rotatably coupled with reel drive shafts of a tape recording and/or reproducing apparatus when the cassette 13 is in use. In accordance with the present invention, a storage receptacle for containing the described cassette 13 is provided with means by which the reel hubs 42 are held against rotation, whereby to avoid loosening of the tape within cassette housing 39 during the storage of cassette 13 in the storage receptacle.

Referring now to FIGS. 4, 6 and 7, it will be seen that such means for preventing rotation of the reel hubs of a cassette 13 stored in the receptacle 10 according to this invention includes flexibly resilient stop elements 45 projecting inwardly from side wall 23b of holder 12 at locations spaced apart along the latter so as to extend into openings 43 and engage the respective reel hubs 42 of a cassette 13 when the latter is cradled or disposed in holder 12. In the embodiment of the invention shown on FIGS. 4, 6 and 7, the flexibly resilient stop elements 45 are in the form of tabs normally extending at right angles from the opposite ends of an elongated strip 46 of a suitably flexibly resilient plastic resin. The strip 46 is shown to be disposed against the outer surface of side wall 23b and secured to the latter at locations spaced from the ends of strip 46, as by lugs 47 on wall 23b that are upset in corresponding holes formed in strip 46. Further, side wall 23b of holder 12 is formed with spaced apart openings 48 through which the flexibly resilient stop elements or tabs 45 can extend into holder 12 from the respective ends of strip 46. As is shown on FIG. 7, when a cassette 13 is being slidably inserted in the direction of the arrow 49 between walls 23a and 23b of holder 12, the cassette housing 39 deflects stop elements or tabs 45 into openings 48 with consequent flexing of the respective end portions of strip 46 so that the resiliently flexible stop elements or tabs 45 do not interfere with the slidable insertion of cassette 13. When cassette 13 is fully inserted or cradled in holder 12, the openings 43 of its housing 39 register with openings 48 in side wall 23b so that stop elements 45 can then return to their normal positions shown on FIG. 6, in which normal positions stop elements or tabs 45 extend into the respective reel hubs 42 and engage between projections or splines 44 of such reel hubs for holding the latter against rotation. Preferably, the flexibly resilient tabs or stop elements 45 extend obliquely with respect to the longitudinal axis of strip 46 to facilitate their deflection by the cassette housing when inserting or removing the cassette.

Referring now to FIGS. 8A–8D, it will be seen that the resiliently flexible stop elements for preventing rotation of the supply and takeup reels of a cassette cradled in holder 12 may have various forms other than those described above with reference to the embodiment of FIGS. 4, 6 and 7. Thus, for example, as shown on FIG. 8A, an endless loop of flexibly resilient plastic resin is first flattened, and then the end portions of the flattened loop are formed to extend at right angles to the remainder of the flattened loop and thereby define the tabs or stop elements 45a extending from opposite ends of the strip 46a. The tabs 45a and strip 46a on FIG. 8A are each formed of two layers of the flexibly resilient material that are movable relative to each other so as to decrease the resistance of tabs 45a to the insertion or removal of a cassette in the respective holder. In the arrangement shown on FIG. 8B, the tabs 45b extending from the opposite ends of the flexibly resilient strip 46b are bifurcated or provided with medial slots to increase the flexibility thereof. In the arrangement shown on FIG. 8C, the tabs or stop elements 45c extending from the opposite ends of the strip 46c are substantially V-shaped so that, when such tabs 45c are engaged in the reel hubs of a cassette, one or the other of the sides of each V-shaped stop element will be angled in opposition to the direction of turning of the respective reel for unwinding the tape therefrom, and thus will provide increased resistance to such unwinding rotation. In the arrangement shown on FIG. 8D, each of the tabs or stop elements 45d extending from the ends of strip 46d is formed with a central thickened portion or post 45'd for increasing the rigidity of the tab when engaged in a respective reel hub of a cassette. It will be apparent that the arrangements shown on FIGS. 8A–8D may be mounted on the holder 12 of a storage receptacle according to this invention in the same manner as the stop elements 45 and associated strip 46 described above with reference to FIGS. 4, 6 and 7. Of course, in the case of the arrangement shown on FIGS. 8C and 8D in which the respective stop elements 45c and 45d are relatively stiff, the deflection of such stop elements out of the path of a cassette during the insertion or removal of the latter is achieved primarily by flexing of the adjacent end portions of the strip 46c or 46d.

Referring now to FIG. 9, it will be seen that, in another embodiment of this invention, the holder 12A of a storage receptacle which may be otherwise similar to the previously described holder 12 is provided with stop elements in the form of clusters of flexibly resilient or rubbery pins 145 extending from two circular bases 146a and 146b which are cemented or otherwise suitably secured in spaced circular holes 148a and 148b, respectively, formed in side wall 23b of the holder. Thus, when a cassette 13 is being inserted in holder 12A, the clusters of flexibly resilient pins 145 are deflected by the cassette housing 39 until the latter is fully inserted in holder 12A, whereupon the pins 145 return to their normal positions and engage in the reel hubs 43 between the projections or splines 44 of the latter for preventing rotation of the reels of the cassette 13 cradled in holder 12A.

Figure 10:
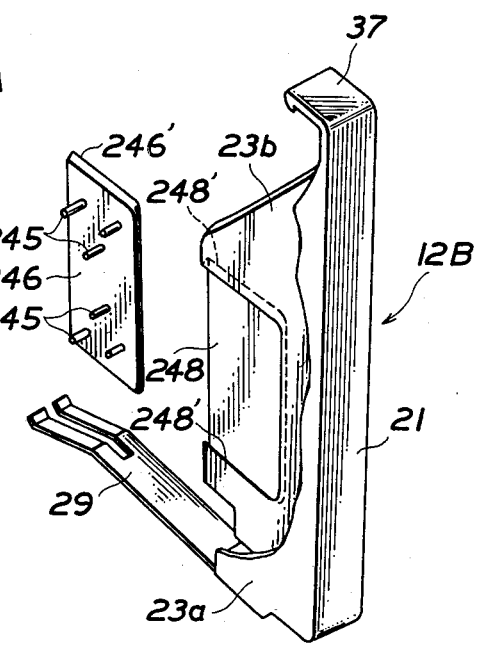

In the holder 12B according to another embodiment of this invention, the stop elements for preventing rotation of the reels of a cassette cradled in a holder 12B (FIG. 10) are again constituted by two clusters of flexibly resilient pins 245, which, in this case, extend from a common base plate 246. Such base plate 246 has bevelled edges 246' so as to be of dovetail cross-section. Side wall 23b of holder 12B is shown to have a recess 248 in its inner surface which is adapted to receive base plate 246 and which has undercut edges 248' so as to be of complementary dovetail cross-section. Thus, base plate 246 can be slidably inserted in recess 248 and retained in the latter.

Figure 11:
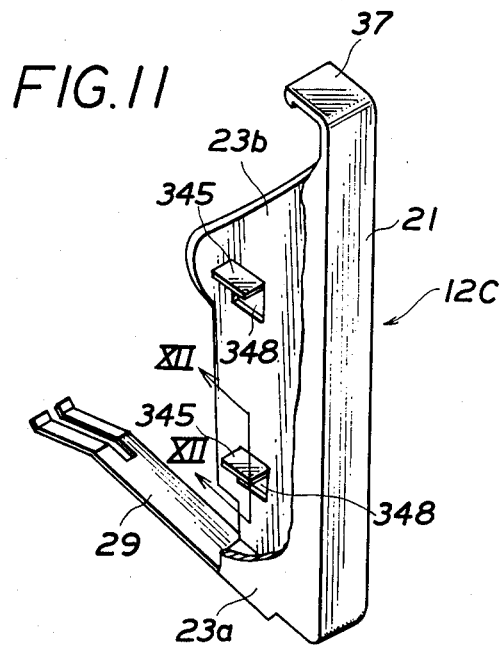
Figure 12:
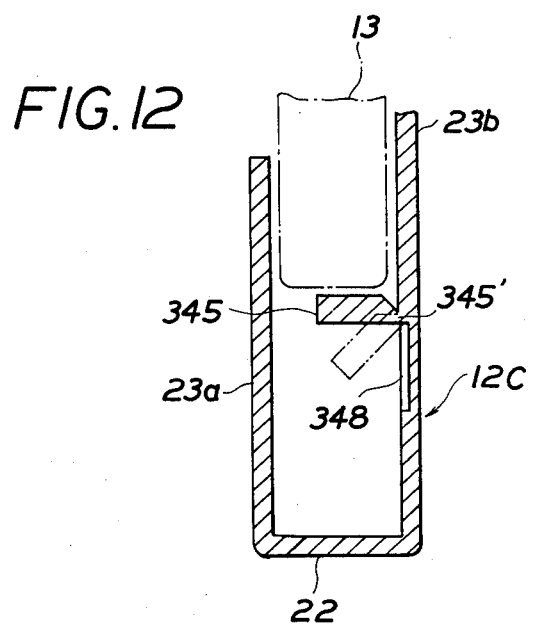
FIG. 12 is an enlarged, detail sectional view taken along the line XII—XII on FIG. 11.

In all of the foregoing embodiments of the invention, the resiliently flexible stop elements have been shown to be formed independently of the holder 12, 12A or 12B, and thus can be formed of a plastic resin which is more flexible than that of the respective holder. However, as shown on FIGS. 11 and 12, stop elements 345 for preventing rotation of the reels in a cassette cradled in a holder 12C may be formed integrally with the latter. More specifically, it will be seen that the stop elements or tabs 345 formed integrally with side wall 23b of holder 12C are provided with the requisite resilient flexibility by being joined to wall 23b at thin cross-sections 345' (FIG. 12) forming resiliently flexible hinges between stop elements 345 and side wall 23b. Further, as shown, the inner surface of side wall 23b is preferably formed with recesses 348 adjacent stop elements 345 and into which the stop elements can fold or nest when being deflected in response to the insertion of a cassette 13 into holder 12C.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of this invention as defined in the appended claims.

What is claimed is:

1. A storage receptacle for a magnetic tape cassette having a casing containing rotatable tape supply and takeup reels with reels hubs exposed at openings in the casing: said storage receptacle comprising a housing having spaced apart, parallel side walls which, between their forward edges, define an opening at the front of the housing; and a holder pivotally connected with the housing for swinging movement through said front opening of the housing between an opened position in which said holder projects forwardly from said housing and a closed position in which said holder closes said front opening of the housing and is substantially contained in the latter, said holder including side walls movable between said side walls of the housing and being spaced apart for slidable insertion and removal of a cassette between said side walls of the holder with the latter in said opened position, and flexibly resilient stop elements normally projecting inwardly from one of said side walls of the holder for engaging said reel hubs of the cassette when the latter is disposed in the holder for resisting turning of the supply and takeup reels, said flexibly resilient stop elements being deflectable by said casing of a cassette out of the path of movement of the latter between said side walls of the holder during said slidable insertion and removal of the cassette therebetween.

2. A storage receptacle according to claim 1; in which said stop elements are directed inwardly from the opposite ends of an elongated strip which is mounted on said one side wall of the holder.

3. A storage receptacle according to claim 2; in which said elongated strip extends at the outside of said one side wall of the holder and is secured to the latter at locations spaced from said opposite ends of the strip, and said stop elements extend from said strip through openings in said one side wall of the holder.

4. A storage receptacle according to claim 1; in which said holder is molded of a plastic resin, and said stop elements are integral parts of said molded holder and are joined to said one side wall of the latter at thin cross-sections forming resiliently flexible hinges therebetween.

5. A storage receptacle according to claim 1; in which said stop elements extend from at least one base plate which is secured in said one side wall of the holder.

6. A storage receptacle according to claim 5; in which said one side wall of the holder has a recess with undercut margins extending to an edge thereof, and said base plate has a cross-section that is complementary to that of said recess so as to be slidably engaged in said recess.

7. A storage receptacle according to claim 5; in which said one side wall of the holder has an opening for each said base plate and in which the latter is secured.

* * * * *